(12) United States Patent
Steinmeyer

(10) Patent No.: US 6,798,095 B2
(45) Date of Patent: Sep. 28, 2004

(54) DEVICE INCLUDING COMPONENT, WHICH IS FERROMAGNETIC IN CRYOGENIC TEMPERATURE RANGE AND CAN BE SUBJECTED TO MECHANICAL LOADS

(75) Inventor: Florian Steinmeyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/398,909

(22) PCT Filed: Sep. 28, 2001

(86) PCT No.: PCT/DE01/03730

§ 371 (c)(1),
(2), (4) Date: Apr. 11, 2003

(87) PCT Pub. No.: WO02/31949

PCT Pub. Date: Apr. 18, 2002

(65) Prior Publication Data

US 2004/0012288 A1 Jan. 22, 2004

(30) Foreign Application Priority Data

Oct. 11, 2000 (DE) ........................................ 100 50 371

(51) Int. Cl.$^7$ ................................................. H02K 9/00
(52) U.S. Cl. ............................ 310/58; 310/54; 505/705
(58) Field of Search ................................ 310/54–60 R, 310/52, 62, 63, 179, 261, 42; 505/705; 335/216

(56) References Cited

U.S. PATENT DOCUMENTS

| 4,336,441 A | * | 6/1982 | Godai et al. ........ 219/137 WM |
| 4,687,525 A | | 8/1987 | Biniasz et al. .............. 148/332 |
| 5,030,863 A | * | 7/1991 | Yoshimura et al. ........... 310/52 |
| 5,407,331 A | * | 4/1995 | Atsumi ....................... 417/420 |
| 5,710,469 A | | 1/1998 | Ries .......................... 310/90.5 |
| 5,777,420 A | | 7/1998 | Gamble et al. ............. 310/261 |
| 6,255,005 B1 | | 7/2001 | Yokoyama et al. ......... 428/683 |

FOREIGN PATENT DOCUMENTS

| DE | U 94 03 202.5 | 5/1995 | |
| DE | 198 13 211 | 10/1999 | |
| GB | 380805 | 9/1932 | |
| JP | 2-254962 | * 10/1990 | .......... H02K/55/04 |
| WO | WO 96/08830 | 3/1996 | |

OTHER PUBLICATIONS

Reed, R., "Materials at Low Temperatures", American Society for Metals, 1983, pp. 259, 388–389, month unknown.
Japanese Patent Abstract 02-254962, Oct. 1990.
Reed, R., "Materials at Low Temperatures", American Society for Metals, 1983, pp. 259, 388–389.

* cited by examiner

Primary Examiner—Thanh Lam
Assistant Examiner—Judson H. Jones
(74) Attorney, Agent, or Firm—Staas & Halsey LLP

(57) ABSTRACT

At temperatures located in a cryogenic temperature range, nickel steel is used for components, which can be subjected to high levels of mechanical stress and which have ferromagnetic properties at these temperatures.

9 Claims, 4 Drawing Sheets

DEVICE INCLUDING COMPONENT, WHICH IS FERROMAGNETIC IN CRYOGENIC TEMPERATURE RANGE AND CAN BE SUBJECTED TO MECHANICAL LOADS

CROSS REFERENCE TO RELATED APPLICATIONS

This application is based on and hereby claims priority to German Application No. 10050371.3 filed on Oct. 11, 2000, the contents of which are hereby incorporated by reference.

BACKGROUND OF THE INVENTION

The present invention relates to a device preferably operating in the temperature range of liquid air. The material, which inevitably has to be able to withstand mechanical load and/or temperature changes and embrittlement, of the component of the device which can be subjected to high mechanical loads must also have required ferromagnetic properties and/or a high magnetic conductivity for the intended magnetic flux guidance and/or flux amplification.

It is known from, e.g. Reed, Materials at Low Temperatures, pages 388/389, to use nickel steel with a nickel content of between 3.5 and 9% for components which can be subjected to mechanical loads for cryogenic applications, i.e. for the temperature range <173 K. Examples of such components include tanks which are required for storing and transporting liquefied gases, such as for example liquid air. Nickel steel with a nickel content of 12% has also already been developed for temperatures below 77 K and especially for use in connection with liquid helium at 4 K. It is essential for these materials that the transition temperature from ductile to brittle be reduced to below the intended application temperature. The abovementioned reference by Reed also refers to additives which may be present in the nickel steel.

However, for the use of a material which corresponds to the invention, it is not only its temperature-dependent mechanical property which is of crucial importance, but also it is necessary for the material which is mechanically suitable for the temperature range mentioned also to have a ferromagnetic property.

The latter property is crucial, for example, when the material is to be used for magnetic flux guidance and/or flux amplification in machines and machine parts which include superconducting elements. Examples are contactless bearings which also include superconducting structural elements which hold a rotating machine shaft in a floating position without contact in a bearing shell by magnetic repulsion forces. In this context, reference is made, for example, to German Utility Model U 9403202.5 "Magnetische Lagerungseinrichtung mit Hoch-$T_c$-Supraleitermaterial" and to U.S. Pat. No. 5,777,420 "Superconducting Synchronous Motor Construction".

SUMMARY OF THE INVENTION

Therefore, it is an object of the present invention to use a material which, at the low operating temperatures required, has sufficient strength, even in the long term, for the expected mechanical loads, e.g. does not become brittle at the low temperatures, and moreover has ferromagnetic properties for the purpose of magnetic flux guidance and/or amplification, for a component of the device which is of relevance in this context.

It was determined as a result of tests being carried out that a nickel steel X8Ni9, DIN 1.5662, US standard ASTM A353, A553 has ferromagnetic properties for the abovementioned purposes even at temperatures below 77 K. This is a temperature range which is preferably of relevance to the invention. Even at these low temperatures, this material has so little tendency to become brittle that it does not suffer any ductile fracture even under mechanical load. Nickel steel containing from 3.5 to 8% of nickel also has a sufficiently high ferromagnetic property for the above-mentioned applications to enable it to be used for elements for magnetic flow guidance and/or amplification. The same is also true of nickel steel containing 12 to 13% of nickel.

Not only does the mechanical strength of the material with ferromagnetic properties required in accordance with the object play a role in, for example, rotating machine parts, on account of the centrifugal forces which occur, but also reliably mechanical stable material is advantageous or even imperative for the encapsulation and holding of magnet with high-temperature superconductor coils. This is the case, for example, if the holder also acts as a flux-guiding means.

BRIEF DESCRIPTION OF THE DRAWINGS

These and other objects and advantages of the present invention will become more apparent and more readily appreciated from the following description of the exemplary embodiments, taken in conjunction with the accompanying drawings of which.

DETAILED DESCRIPTION OF THE PREFERRED EMBODIMENT

Figure 1:
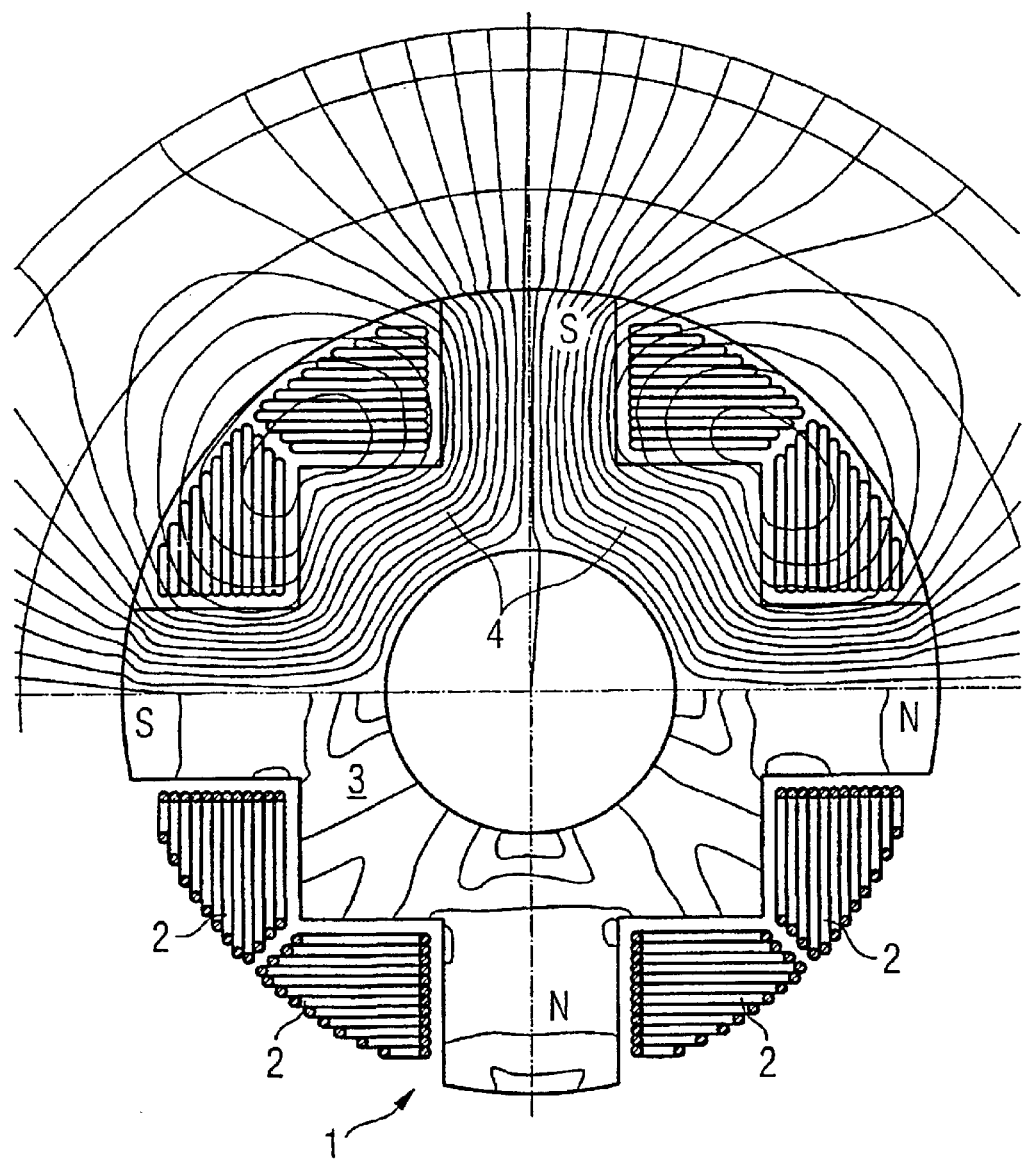
FIG. 1 shows a cross section through a rotor of an electric motor with superconducting field excitation in the rotor and a rotor core as component made from material which is used in accordance with the invention.

Reference will now be made in detail to the preferred embodiments of the present invention, examples of which are illustrated in the accompanying drawings, wherein like reference numerals refer to like elements throughout.

In FIG. 1, 1 denotes, as the device of the invention, the rotor, which in FIG. 1 is illustrated in cross section perpendicular to the axis, of an electric motor with superconducting excitation winding. The superconducting coils, which are arranged or designed in stepped form, are shown in one half of the illustration and denoted by 2. They include, in a known way, strip conductor windings made from a high-temperature superconducting material used for this purpose. Materials of this type are well known. A current which is excited in a coil 2 of this type generates a magnetic field with a magnetic field H or magnetic flux density B which in the inner cross-sectional region of the coil is directed axially with respect to the coil. This rotor also includes, in a manner which is known for rotors for electric motors, a core 3 which guides the magnetic flux, as a component which is advantageously made from ferromagnetic material. 4 denotes magnetic flux guidance of this type in this core 3. With the structure of the in this case 4-pole rotor which is illustrated, there are then two north poles N and two south poles S as poles of the core 3 or rotor 1 of the motor, as is known.

According to the invention, this core 3 preferably consists of nickel steel, with a nickel content of 9 to 13%, or is DIN standard steel X8Ni9 DIN 1.5662.

Figure 2:
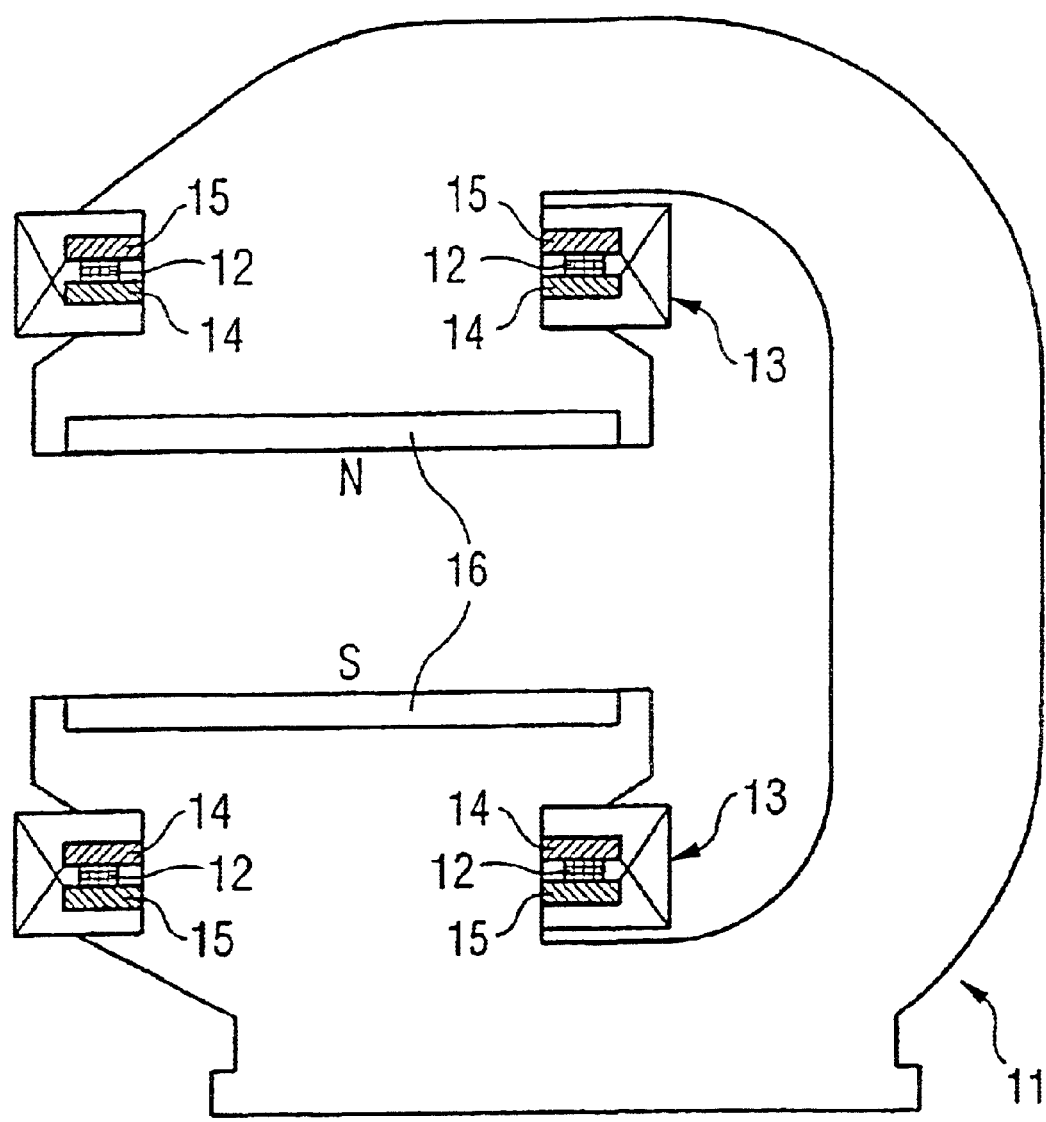
FIG. 2 shows a high magnetic field device with superconducting magnet field coil, as is known in principle, for example, from DE-C 19813211.

FIG. 2 shows a magnet 11 with superconducting coils 12 which is known in terms of its design principles. These coils are located in a cryostat housing 13 with a correspondingly thermally insulated holder. Two steel rings as a component of the invention are denoted by 14 and 15 and in this case are used for magnetic flux guidance and shaping. These components are exposed to considerable magnetically induced mechanical forces. Therefore, these rings are made from nickel steel. This flux-guidance measure makes it possible to improve the homogeneity of the magnetic field between the poles 16 of the magnet 11.

Figure 3:
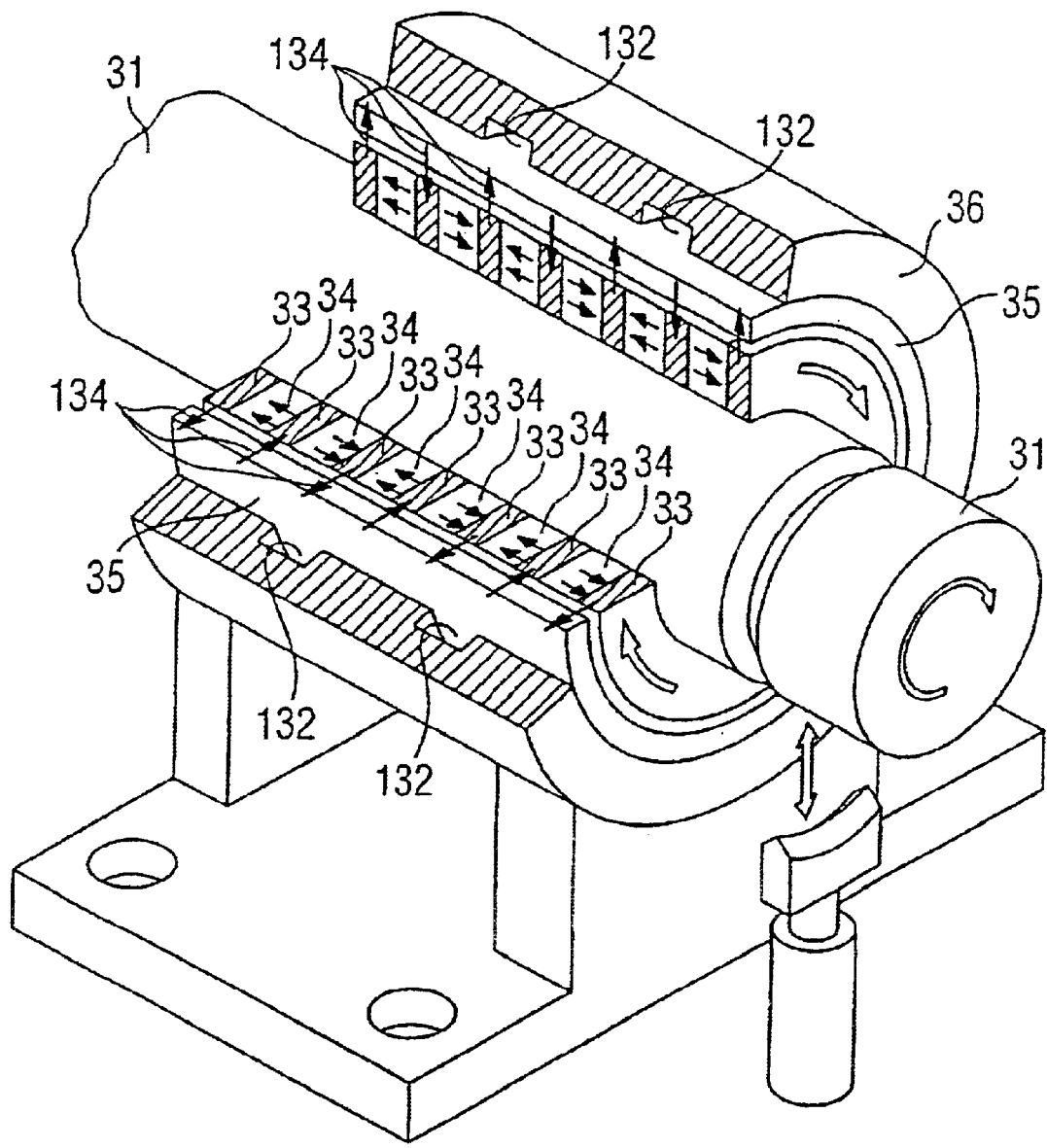
FIG. 3 shows a magnetic bearing of a rotor shaft using high-temperature superconductor material, as is known in principle from DE-C 4436831.

FIG. 3 shows a magnetic floating bearing, which is known from the abovementioned patent, of a rotor shaft 31. 34 denotes annular permanent magnets which are in this case arranged on the shaft 31 and are axially polarized as shown. These permanent magnets 34 are oriented in such a way with respect to one another that the axial magnetic field of two adjacent magnets 34 are opposite one another in these magnets and are then together oriented radially outside the magnets.

For radial guidance of the magnetic flux 134 which originates from the permanent magnets, the rings made from ferromagnetic material, which are denoted by 33 and are illustrated in section, are provided on the shaft 31.

A layer or sleeve of superconducting material is denoted by 35. It is positioned on or at the inner side of the sleeve-shaped outer bearing shell. This superconducting material is cooled to the low temperature required for superconduction by a coolant, e.g. liquid nitrogen. This coolant flows inside the coolant passages which are denoted by 132 and are in this case provided in the stationary outer bearing shell 36.

The electrical shielding currents which occur in the superconducting material when the bearing shaft with the permanent magnets on it rotates effect the magnetomotive forces required for the floating bearing of the shaft.

The gap between the rotating parts and the stationary parts of an arrangement of this type is known to be made as small as possible. However, this has the effect that the permanent magnets and the rings 33 are also cooled to low temperatures. For this reason, it is provided that the rings 33, as components which are subject to mechanical loads as a result of the centrifugal force which occurs, preferably consist of ferromagnetic nickel steel.

Figure 4:
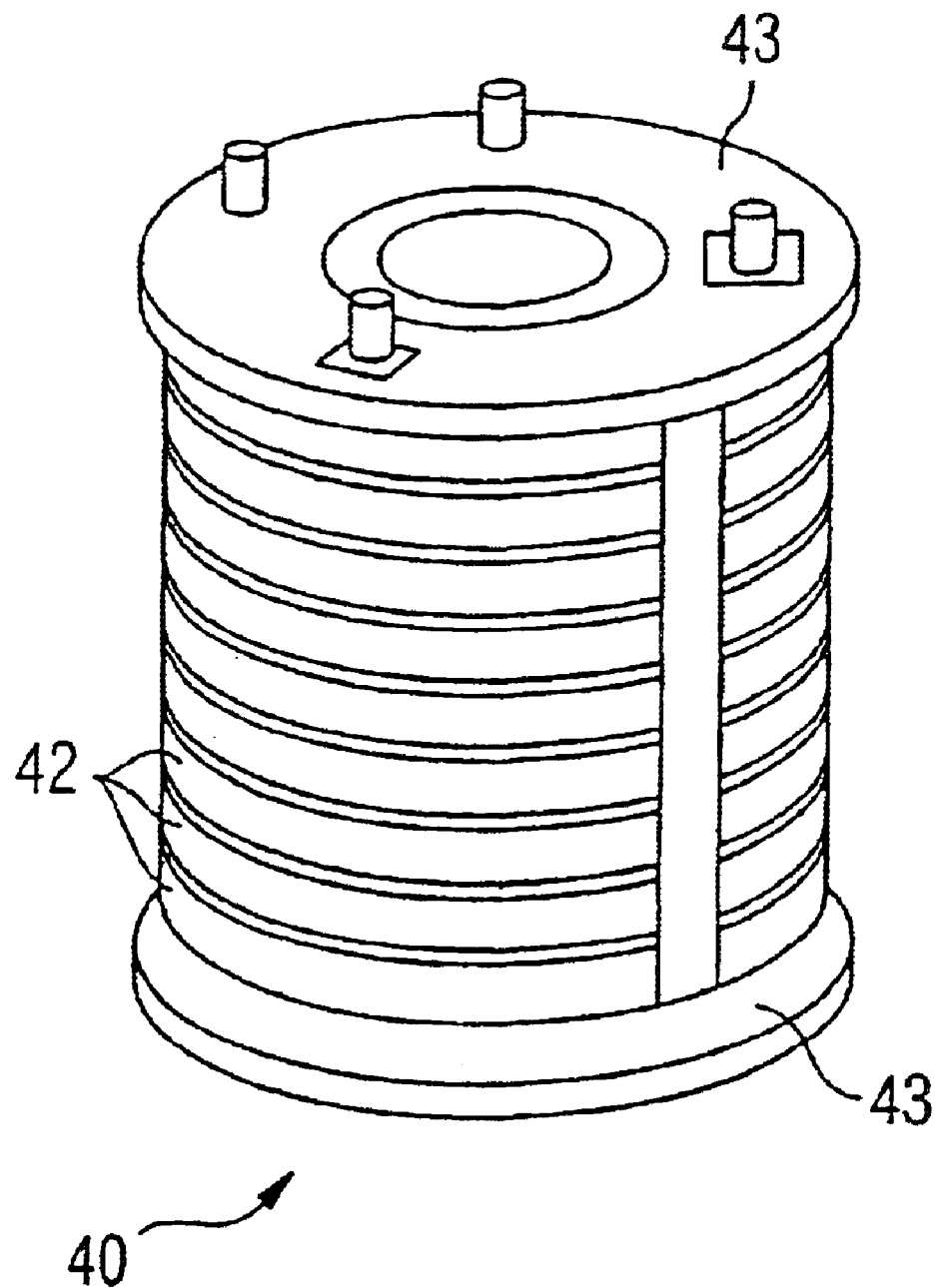
FIG. 4 shows a superconducting magnet coil as Is known from WO 96/08830.

As illustrated, the magnetic field coil 40 shown in FIG. 4 includes superconducting coils 42 positioned on top of one another in the axial direction. At the ends of the coils there are rings 43, the shape and dimensions of which are matched to the coils and which preferably consist of ferromagnetic nickel steel used in accordance with the invention, as the component. The magnetic flux which is known to emanate from this coil produces optimized flux guidance.

The invention has been described in detail with particular reference to preferred embodiments thereof and examples, but it will be understood that variations and modifications can be effected within the spirit and scope of the invention.

What is claimed is:

1. A method of operating an electric motor having rotor winding of superconducting coils, comprising:

cooling said superconducting coils together with a core of a rotor in the motor to a cryogenic temperature below 77° K, the core being formed of a steel containing between 9 percent and 13 percent nickel;

providing, via the core of the motor, magnetic field guidance in a magnetic field with a high field strength; and concurrently with said providing, exposing the core of the rotor to a high mechanical load.

2. The method as claimed in claim 1, wherein the core consists of 9% nickel steel X8Ni9, DIN 1.5662.

3. The method as claimed in claim 2, wherein said cooling produces the cryogenic temperature range in which air is liquid.

4. A method of operating a high magnetic field device, comprising:

cooling at least one superconducting coil to a cryogenic temperature range;

providing, via the at least one superconducting coil, a magnetic field with a high field strength and homogeneity;

providing magnetic field guidance in the magnetic field via a component formed of a steel containing between 9 percent and 13 percent nickel and shaped as one of a disk and a ring; and concurrently with said providing, exposing the component to a high mechanical load.

5. The method as claimed in claim 4, wherein the component consists of 9% nickel steel X8Ni9, DIN 1.5662.

6. The method as claimed in claim 5, wherein said cooling produces the cryogenic temperature range in which air is liquid.

7. A method of operating a magnetic floating bearing, comprising:

cooling stationary parts made from superconducting material to a cryogenic temperature range;

providing a magnetic field with a high field strength via annular permanent magnets on a rotor shaft of the magnetic floating bearing;

providing magnetic field guidance in the magnetic field via components, each formed of a steel containing between 9 percent and 13 percent nickel, shaped as one of a disk and a ring, and arranged between the annular permanent magnets on the rotor shaft of the magnetic floating bearing; and concurrently with said providing, exposing the components to a high mechanical load.

8. The method as claimed in claim 7, wherein the core consists of 9% nickel steel X8Ni9, DIN 1.5662.

9. The method as claimed in claim 8, wherein said cooling produces the cryogenic temperature range in which air is liquid.

* * * * *